(12) United States Patent
Siemens et al.

(10) Patent No.: US 7,272,179 B2
(45) Date of Patent: Sep. 18, 2007

(54) REMOTE SURVEILLANCE SYSTEM (75) Inventors: Michael G. Siemens, Kalispell, MT (US); Daniel F. Sitkins, Kalispell, MT (US); Peter E. Kierstead, Kalispell, MT (US)

(73) Assignee: Security with Advanced Technology, Inc., Westminster, CO (US)

( * ) Notice: Subject to any disclaimer, the term of this patent is extended or adjusted under 35 U.S.C. 154(b) by 814 days.

(21) Appl. No.: 10/285,862

(22) Filed: Nov. 1, 2002

(65) Prior Publication Data

US 2003/0086000 A1 May 8, 2003

Related U.S. Application Data (60) Provisional application No. 60/415,905, filed on Oct. 3, 2002, provisional application No. 60/335,926, filed on Nov. 1, 2001.

(51) Int. Cl.
*H04N 7/12* (2006.01)
*H04N 11/02* (2006.01)
*H04N 11/04* (2006.01)
*H04B 1/66* (2006.01)
*G06F 3/00* (2006.01)
*G06F 13/00* (2006.01)
*H04N 5/445* (2006.01)

(52) U.S. Cl. .................................. 375/240.01
(58) Field of Classification Search ............... None
See application file for complete search history.

(56) References Cited

U.S. PATENT DOCUMENTS

| 4,152,693 | A | | 5/1979 | Ashworth, Jr. |
| 5,049,993 | A | * | 9/1991 | LeGall et al. ............... 348/448 |
| 5,689,442 | A | | 11/1997 | Swanson et al. |
| 5,774,550 | A | * | 6/1998 | Brinkmeyer et al. ........ 713/168 |
| 5,798,458 | A | * | 8/1998 | Monroe ....................... 73/587 |
| 6,037,977 | A | | 3/2000 | Peterson |
| 6,147,823 | A | * | 11/2000 | Matsumi et al. ............... 360/8 |
| 6,211,907 | B1 | | 4/2001 | Scaman et al. |
| 6,246,320 | B1 | * | 6/2001 | Monroe ....................... 340/506 |
| 6,262,764 | B1 | | 7/2001 | Perterson |
| RE37,508 | E | | 1/2002 | Taylor et al. |
| 6,370,198 | B1 | * | 4/2002 | Washino ................. 375/240.26 |
| 6,411,651 | B1 | * | 6/2002 | Rose et al. ............ 375/240.13 |

(Continued)

FOREIGN PATENT DOCUMENTS

EP 0558821 A3 9/1993

*Primary Examiner*—Nhon Diep
(74) *Attorney, Agent, or Firm*—Patton Boggs LLP (57) ABSTRACT

An audio/visual surveillance system for use in mobile vehicles such as patrol cars includes two video cameras producing video signals and four audio sources producing audio signals. The signals are MPEG-2 compressed and streamed in real time with geographic and time data to a digital cartridge-type tape recorder located in the vehicle. A full patrol car shift is recorded on a single tape and, at the end of the shift, the tape is placed in a master sled bay. An MD5 hash authenticates the data for court use. Up to four videos can be synchronized frame-by-frame for simultaneous monitoring. An MPEG-1 stream is sent via wireless to headquarters in real time. One camera captures data external to the vehicle, while the other captures data internal to the vehicle. One audio source captures audio inside the vehicle and another captures dispatcher communications. The other two audio sources are carried by officers.

10 Claims, 5 Drawing Sheets

U.S. PATENT DOCUMENTS

| | | |
|---|---|---|
| 6,456,321 B1 | 9/2002 | Ito et al. |
| 6,618,074 B1 * | 9/2003 | Seeley et al. ............... 348/143 |
| 6,895,166 B1 * | 5/2005 | Schriebman ................. 386/46 |
| 6,970,183 B1 * | 11/2005 | Monroe ..................... 348/143 |
| 2001/0021307 A1 | 9/2001 | Wang et al. |
| 2002/0131768 A1 | 9/2002 | Gammenthaler |
| 2003/0025599 A1 * | 2/2003 | Monroe ..................... 340/531 |

* cited by examiner

REMOTE SURVEILLANCE SYSTEM

RELATED APPLICATIONS

This application claims the benefit of U.S. Provisional Application No. 60/335,926 filed Nov. 1, 2001, and U.S. Provisional Application No. 60/415,905 filed Oct. 3, 2002.

BACKGROUND OF THE INVENTION

1. Field of the Invention

The invention relates to the field of remote audio/visual surveillance, and more particularly to such a system that is compact enough to be carried in a vehicle, such as a patrol car, and at the same time is capable of recording high-resolution video at high frame rates.

2. Statement of the Problem

Audio/visual surveillance systems that are sufficiently compact to be carried in a vehicle, such as a police or patrol car, are well known. These systems generally involve recording audio and visual information on a local recording system in the vehicle, transmitting the audio and visual information to a central command facility for review and/or recording, or combinations of the foregoing. See U.S. Pat. No. 6,037,977 issued May 14, 2000 to Roger Peterson. These systems also often include the acquiring and storing of location information, e.g., the geographical position of the patrol car. See U.S. Pat. No. 4,152,693 issued May 1, 1979 to Ashworth, Jr. These systems have been developed in response to the need for rapidly informing central command facilities, such as police headquarters, of emergency situations and the audio and visual details thereof, and the need for obtaining and preserving audio and visual evidence of crimes, emergencies, and other events that involve police action or participation. For example, to successfully prosecute an individual accused of a crime, the law of the United States of America requires that due process be shown. Audio and visual records can be of critical assistance in proving probable cause for stopping or arrest, and other due process elements.

Audio/video surveillance inherently involves a problem of data transmission and storage, because video data files are generally very large and surveillance must occur for significant periods of time, often days or weeks. Generally, this is addressed in surveillance systems by either saving only a few video frames per second, by storing frames for only a short time and then recycling the storage medium by recording over the previously stored data, or by storing or transmitting only portions of the surveillance data. See, for example, U.S. Pat. No. RE37,508 issued Jan. 15, 2002 to Taylor et al., U.S. Pat. No. 6,211,907 issued Apr. 3, 2001 to Scaman et al., and U.S. Pat. No. 6,456,321 issued Sep. 24, 2002 to Ito, et al. A common solution to the capacity problem is to put the control of the recording devices at the fingertips of the police officers and/or headquarters and have them record only when it is required. See U.S. Pat. No. 6,037,977 referenced above. Surveillance systems also inherently require a system for rapid retrieval of data, and for this reason most state-of-the-art systems data is stored on hard drives or other systems permitting random access. See, for example, U.S. Pat. No. 5,689,442 issued Nov. 18, 1997 to Swanson et al. However, hard drives are fragile if handled improperly, and downloading them without removing them takes so much time that it is unlikely to be done.

Audio/visual surveillance systems are employed in tens of thousands of patrol cars today. State-of-the-art systems, such as the device disclosed in the U.S. Pat. No. 6,037,977 patent mentioned above, give the police officer great flexibility with the multiple cameras and audio sources at his or her disposal. They include the latest technologies, including wireless transmitters, miniature cameras, removable hard drives, and geographical locators. Yet, the goal of having prompt communications with the officers in emergencies and reliable audio and visual evidence for use in court remains elusive. Often, in emergencies, police officers are responding to the situation and do not have time to activate the recording equipment. In most instances, due process evidence is not available because, by the time the systems are turned on, the probable cause evidence has come and gone. Even when the systems have been turned on, the resolution is often so poor that it either is useless or it takes a large amount of computer processing to enhance it to make it useable, or the hazards of police work combined with the fragility of high tech systems causes data to be lost.

Accordingly, there is a need in the art for a patrol car surveillance system that provides high resolution in a compact, rugged, and reliable system that stores sufficient data so that there is a high probability that all due process and other evidentiary data is captured.

SUMMARY OF THE INVENTION

The present invention represents a paradigm shift with respect to patrol car surveillance systems. The prior art patrol car surveillance systems were seen as tools to be subjectively used by police officers. The present invention views surveillance systems as being objective tools of administrators, prosecutors, and courts.

The present invention advances the art and overcomes the aforementioned problems by recognizing that the way to avoid having evidentiary gaps in the audio visual record is to have high resolution audio/visual recording operating at all times that a police car is on patrol, 24 hours a day, 7 days a week, 365 days a year. With the prior art video systems, this would immediately lead to data overload. However, the inventors have also recognized that the above requirement does not mean that the audio/visual system has to be able to store scores of hours or days of data in the vehicle, because patrol officers always work in shifts that generally are of from 8 to 12 hours in length. The inventors have recognized that, if changing the data medium is made simple enough, it can become a routine part of the shift change, and operate repeatably and reliably.

The inventors have recognized that, while the replaceable hard drives that have become part of most surveillance systems today are advertised as being simple to use, in fact, few people can routinely and repeatably perform the change and/or perform a downloading operation without incident. Further, the fragility of hard drives and the hazards of police work make the use of such drives problematic in the patrol car environment. The inventors have also recognized that changing a tape cartridge is something that most people today can do repeatably and reliably. Further, tape cartridges are rugged and tape data is rarely inadvertently destroyed. The inventors have therefore provided an audio/visual surveillance system in which the data is recorded to a tape cartridge within the vehicle. Preferably, it is a digital tape cartridge. The inventors have provided an essentially fail-safe system in which data is reliably and routinely transferred to a central storage system at the end of each shift. The system includes a cartridge tape storage sled bay at the police headquarters or other facility to which officers return at the end of a shift. At the beginning of the shift, each officer is provided a tape cartridge, which they insert in the recorder in their patrol car. At the end of each shift, the officer simply removes the tape cartridge from the patrol car and inserts it in the tape storage sled. The rest is automatic.

The MPEG-2 (Motion Picture Expert Group-2) video/audio compression standard is well known in the movie and video art, though it is usually associated with DVD systems. The MPEG-2 standard provides the high-resolution, dense storage associated with home DVD systems. The inventors have provided a system and process that permits the direct recording of MPEG-2 audio/visual data to a cartridge tape in a patrol car.

The system of the invention also provides for wireless transmission of audio/video directly from the patrol car to the central command center or headquarters. Since wireless transmission does not presently have a broad enough bandwidth to support real time streaming of MPEG-2 audio/visual, the system also provides for MPEG-1 encoding of an audio/visual signal, which MPEG-1 encoded signal is buffered, preferably in a RAM or hard drive, and then may be transmitted on command. Preferably, the MPEG-1 encoding and wireless transmission can be initiated from either the patrol car or from the central command center via a wireless link.

The invention also provides an arrangement of audio and video sources that is designed to capture most, if not all, events of interest. There are two video sources, one of which captures events outside the patrol car and the other of which captures events inside the patrol car. There are at least three audio sources, one of which captures audio inside the patrol car, another which is on one officer's person, and a third that captures the radio exchange with the dispatcher. If two officers are present, a fourth audio source is on the second officer's person. One video signal and two of the audio signals are encoded in a first MPEG-2 channel, and the second video signal and the third and fourth audio signals are encoded on a second MPEG-2 channel.

The two MPEG-2 signals are buffered, formed into data packets, and multiplexed into a single data stream. The multiplexed data stream is preferably buffered to remove asynchronies between the tape movement and the incoming stream, and then is recorded on the tape.

Both MPEG-2 and MPEG-1 contain time synchronization data. As known in the MPEG art, each frame contains synchronization information. Further, the synchronization data is keyed to a GOP (Group of Pictures) header that occurs regularly, for example every 15$^{th}$ frame, in the MPEG data, or approximately every one-half second. This synchronization data time correlates the individual MPEG frames. Geographic location data and, preferably, absolute time data is acquired via a satellite link. Hour/minute/second data is automatically incorporated into the MPEG data as known in the MPEG art. Preferably, the tape is parsed by the invention, and the location of each GOP header is found. This GOP header location information and year/month/day data are cached in a buffer and recorded in a tracking location on the tape. Using the year/month/day data and the MPEG synchronization data, each frame can be accurately time referenced. The absolute time signal is used to periodically update the clock of the system computer. In this manner, each frame can be time referenced within a fraction of a second. The geographic data is preferably recorded in a special digital frame that is recorded regularly on the tape, preferably every five seconds. This digital frame also preferably includes information such as if and when the patrol car shotgun is removed from its rack, radar data, and any other special data that a user may desire. Preferably, all of this data is also recorded in a header to each data packet so that in case of system failure, all the geographic and time data can be reconstructed.

Once the tape cartridge is inserted into the sled bay in the central command center or other location, the system, software, and method of the invention permit the audio/visual data to be easily retrieved, monitored, synchronized with other data, stored, and archived. The fact that it is encoded via the MPEG-2 standard facilitates this. The data on the tape is preferably transferred to a hard drive of a command server, preferably with a form of RAID data storage. If the data is to be monitored, multiple videos can be synchronized and viewed at the same time. In the preferred embodiment, up to four videos can be viewed at the same time. For example, if four police units were at an event and recorded the event, the event can be viewed from four different angles. The data can also be decoded and transferred to any desired medium, for example, an analog tape or a DVD disk.

The system of the invention permits the tape-hard drive cache system of the invention to be accessed as a universal naming convention (UNC) drive, which is most commonly, implemented as a letter. That is, using conventional software programs, such as Windows™, the invention permits the tape-hard drive cache system to be designated as the "D" drive, for example.

The MPEG-1 low-resolution data stream is also buffered in the central location on a hard drive of a server. It may be decoded and monitored directly, or it may be decoded and stored on any suitable medium, such as a VHS recorder. Via the tracking data, it may be synchronized with MPEG-1 data from other units, or at a later time, with MPEG-2 data in storage.

The invention also includes an authentication process that ensures that the recorded audio/visual evidence will be acceptable to the courts. Preferably, a private pass-code is assigned to each patrol car as it goes in the field. This pass-code is used to generate a verification code that is stored on the tape. This verification code can be used to authenticate the data at any time by running a verification procedure, preferably a checksum procedure.

The invention enables essentially all audio/visual information associated with a patrol car to be reliably captured, monitored, correlated, stored, retrieved, and authenticated. For example, a common occurrence today is that a suspect or criminal will claim officer brutality and point to bruises as evidence of the charge. Often, however, the bruises are self-inflicted after the person has been confined within the back seat of the patrol car. Each such charge, even if false, usually costs the jurisdiction a significant amount of money, on the order of $25,000, in investigating the charge and prosecuting it, if necessary. The invention will go a long way toward reducing and/or eliminating such expenses. The above and other advantages of the present invention may be better understood from a reading of the following description of the preferred exemplary embodiments of the invention taken in conjunction with the drawings in which:

DETAILED DESCRIPTION OF THE PREFERRED EMBODIMENT

Figure 1:
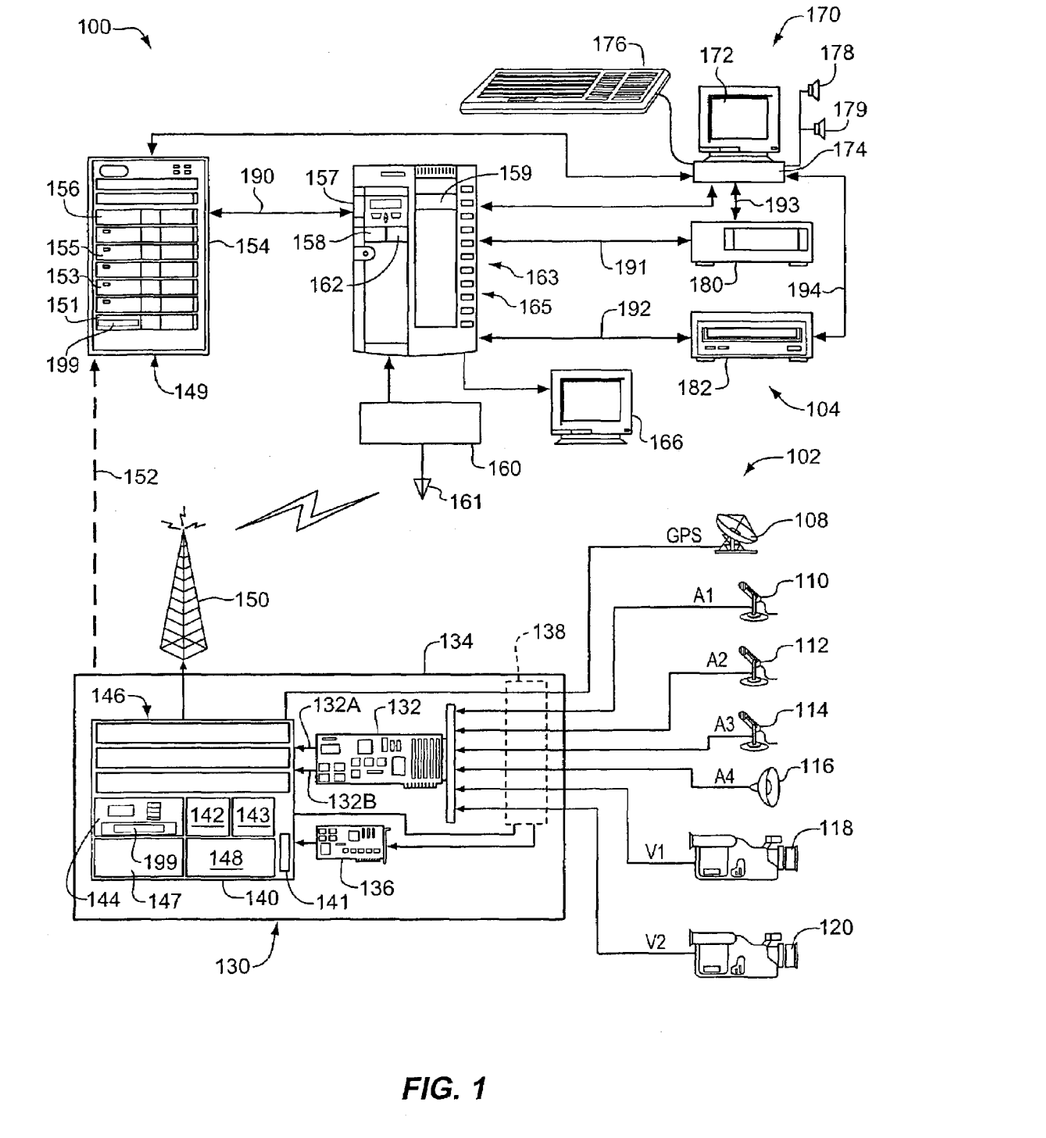
FIG. 1 is a block diagram of a preferred embodiment of the invention.

FIG. 1 is a block diagrammatic view of a preferred embodiment of a surveillance system 100 according to the invention. Surveillance system 100 includes a patrol unit 102 and a command center unit 104. In one aspect of the invention, high resolution audio/visual data for an entire patrol car shift is recorded on a tape 199 in recorder 144, and, at the end of the shift, the tape 199 is removed by the patrol officer and transferred, as indicated by arrow 152, to a master sled bay 154 in the command unit 104. Once in the sled 154, the data may be smoothly retrieved by buffering it temporarily in hard drives 158, monitored on monitor 172, stored on a tape via recorder 180, or archived on a DVD or CD via a DVDR or CDR recorder 182. In another aspect of the invention, lower resolution audio/visual data is transmitted via transmitter 146 and antenna 150 to command center antenna 161 and receiver 160 where it is buffered on hard drives 159 and monitored on monitor 166. It also may be stored via tape drive 180 or DVDR/CDR 182.

Turning now to the details of the invention, patrol unit 102 includes a satellite signal receiver 108, a first audio source 110, a second audio source 112, a third audio source 114, a fourth audio source 116, a first video source 18, and an electronics box 130. Electronics box 130 includes a housing 134, and a switch 138, which is optional and therefore is shown by dashed lines, an MPEG-2 encoder 132, an MPEG-1 encoder 136, and a computer 140. Computer 140 includes parallel and serial ports 141, processor 142, RAM 143, a tape drive 144, a plurality of hard drives 146, a transmitter 147, and a receiver 148. Patrol unit 102 also includes antenna 150.

Command center unit 104 includes master sled bay 154, command center server 157, receiver 160, antenna 161, MPEG-1 monitor 166, computer 170, tape recorder 180, and DVDR recorder 182. As known in the art, master sled bay 154 is essentially a plurality of tape drives, such as 151, 153, 155, and 156, along with control electronics. Command server 157 includes processor 158, hard drives 159, RAM memory 162, MPEG-2 decoders 163, and MPEG-1 decoder 165. Preferably, the hard drives 159 are organized into a RAID (Redundant Array of Inexpensive Disks) type storage system. Computer 170 includes monitor 172, electronics 174 including a processor and input and output cards as known in the art, and input device 176, which preferably is a keyboard. The various components of command unit 104 are connected by appropriate interfaces 190-194 as known in the art. Preferably, interfaces 190, 191, and 192 are SCSI interfaces.

In FIG. 1, only the components of the surveillance system 100 essential for understanding the invention are specifically shown. As known in the art, the system 100 will include many other electronic parts such as clocks, ports, busses, motherboards, etc., necessary for the functions described.

Figure 6:
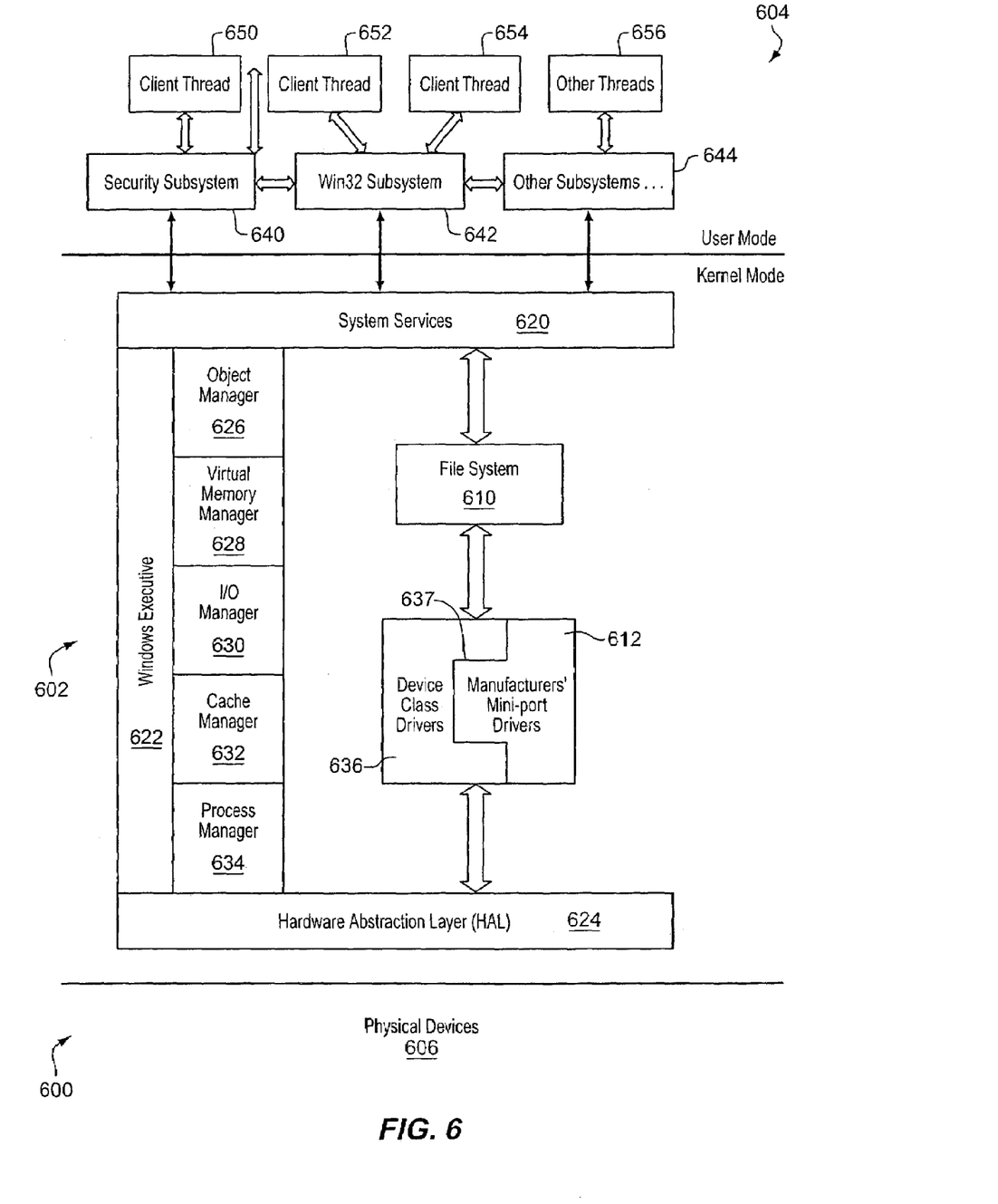
FIG. 6 is a schematic diagram showing the relationships between the software and hardware components of the embodiment of FIG. 1.

The invention operates as follows. The satellite antenna 108 receives a GPS (Geographic Positioning Signal) and time signal T from satellites in orbit. How such signals are produced and received is well known in the electronics art. The GPS and time signals are fed to a serial port 141. The time signal is used to periodically set the clock of computer 140. Periodically, the GPS signal is processed, as known in the art, to produce geographic positioning information, which is buffered and recorded as will be described in detail below (FIG. 6). In the preferred embodiment, the patrol car position is determined every five seconds. The audio sources 110-116 provide audio signals A1 through A4 and the video sources 118 and 120 provide video signals V1 and V2. Preferably, audio sources 110, 112, and 114 are microphones, and audio source 116 is an audio input that tracks the audio exchanged with the police dispatcher via the patrol car radio. Audio sources 118 and 120 are high-resolution video cameras. Signals A1 through A4 and V1 and V2 are directed to MPEG-2 encoder card 132. Optionally, a switch 138 can direct a selected video signal and a selected pair of audio signals to MPEG-2 encoder card 136. Switch 138 may be activated from within the patrol car, or may be activated from the command center via receiver 148. Alternatively, a predetermined pair of signals A1 through A4 and a selected one of signals V1 and V2 may be directed to MPEG-1 encoder 136. Encoder card 132 is a dual decoder in that it decodes two channels 132A and 132B of MPEG-2 signals. The encoded MPEG-2 signals from encoder 132 are buffered in hard drives 146 and written to a tape, preferably a cartridge tape, via recorder 144 as will be described in detail below. The encoded MPEG-1 signal from encoder 136 is buffered in RAM 143 and transmitted via transmitter 147 and antenna 150.

The encoded MPEG-1 signal is received via antenna 161 by receiver 160, processed by processor 158 as directed by software as described in more detail below, buffered in hard drives 159, decoded by MPEG-1 decoder 165, and displayed on MPEG-1 monitor 166. This process, as well as the activation of switch 138 in patrol unit 102, is controlled via computer 170. The MPEG-1 signal may also be stored via tape recorder 180 or DVDR/CDR recorder 182, or, shown in FIG. 4, stored via a VHS recorder 460.

The tape on which the MPEG-2 signal is recorded is transferred to sled 154 by inserting it into one of tape drives 149 at the end of a patrol car shift. The data on the tape is then processed by server 157. As discussed in more detail below, via a software program stored in memory 162, the instructions of which are processed by processor 158, the data is buffered in hard drives 159, depacketized, and decoded by MPEG-2 decoders 163 into audio and video signals. The video signals are applied to monitor 172 to view the video while the audio signals are applied to speakers 178 and 179. Often, the decoded signals are also stored in some form. For example, utilizing computer 170, a user may select a certain portion of the recorded tape as being particularly relevant in a particular court matter. This portion may be depacketized and the MPEG-2 data may be burned into a DVD disk via DVDR recorder 182. This disk may then be taken to court as evidence, without the need to have the entire command center 104 in court. The depacketized and decoded audio and video signals may be stored by recording on tape via VHS recorder 180. However, since the VHS tape would not include authentication information (see below), such VHS tapes would generally be used for training purposes only.

Figure 2:
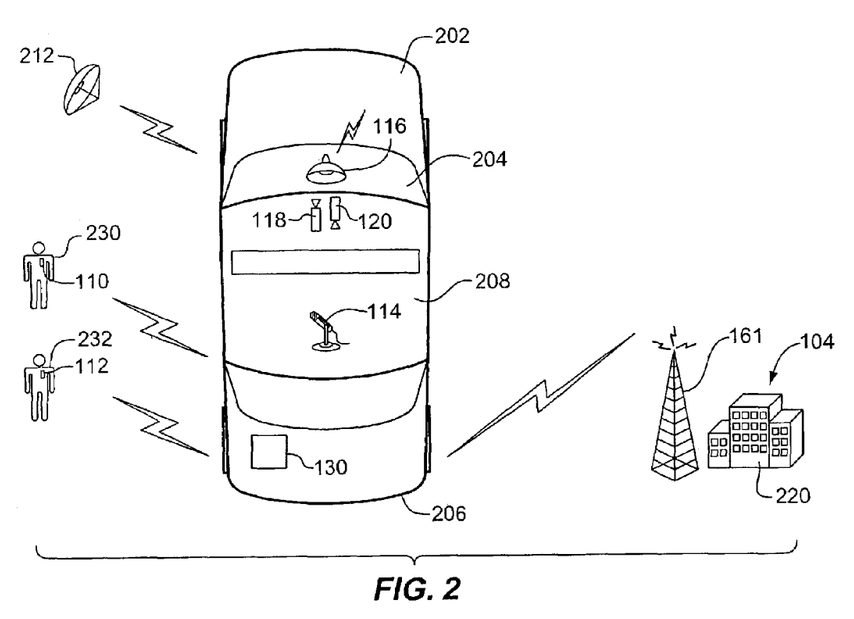
FIG. 2 is a schematic view showing the location of the audio, visual, and satellite sources and wireless transmissions associated with the invention.

FIG. 2 is a schematic diagram showing the preferred locations of the audio and sound sources and the electronics box 130 with respect to patrol car 202 and officers 230 and 232. Electronics box 130 is preferably located in the trunk 206 of patrol car 202, but may be located under a seat or elsewhere. First video source 118 is preferably a high-resolution miniature video camera located just above the rear view mirror, and its lens is directed forward through the windshield 204 of the patrol car 202. Second video source 120 is preferably a high-resolution miniature video camera located next to the first video source, but is directed rearward and includes a wide angle lens to capture everything that occurs inside the passenger compartment 208. First audio source 110 preferably is a microphone, preferably located on a first officer 230. Second audio source 112 preferably is a microphone, preferably located on a second officer 232. Third audio source 114 is preferably a directional microphone located in a hidden position near the rear of the passenger compartment 208. The directional characteristics are selected to capture audio anywhere in the passenger compartment 208. Fourth audio source is preferably a microphone associated with the two-way radio in the patrol car so as to capture the communications with the dispatcher. As known in the art, GPS satellite 212 is preferably located in stationary orbit of the earth. The headquarters 220 may be located anywhere that has access to a wireless signal via antenna 161.

Figure 3:
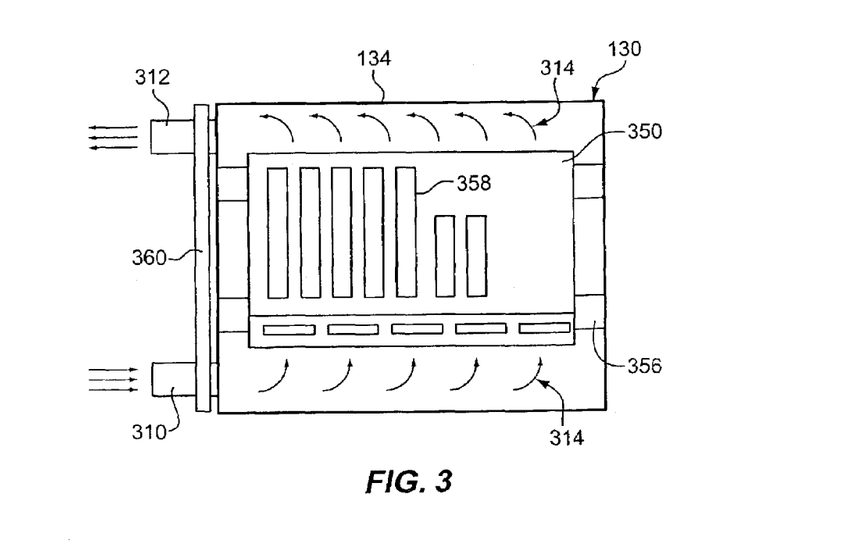
FIG. 3 is a schematic diagram showing the electronics enclosure of FIG. 1 and the airflow through the enclosure.

FIG. 3 shows the interior of electronics box 130. The electronic components 132, 136, 138, 141, 142, 143, 144, 146, 147, 148 (FIG. 1) are mounted on one or more circuit boards 350 that are suspended on flexible shock absorber supports 356 attached to housing 134. Note that the components are only shown generally on board 350; thus, the various elements, such as 358, are not meant to illustrate specific components in specific places. The box 130 is vented via a fan (not shown) with cooling air entering at entrance port 310 and exiting at exit port 312. Ports 310 and 312 are preferably coupled to the outside air. Ports 310 and 312 are coupled to enclosure 134 via a flexible strain relief 360 to reduce jarring of the electronics by forces exerted on the ports. The cooling air follows a path shown by arrows 314. Enclosure 134 preferably has a volume of less than 0.15 meters cubed, more preferably 0.1 cubic meters or less, and most preferably 0.03 cubic meters or less.

Preferably, the tape drives 144, 151, 153, etc., are an ADR™ tape drive manufactured by OnStream Data B.V., based in the U.S. and Netherlands. This tape utilizes a completely enclosed cartridge. Several key features of this tape drive relevant to the invention are that the tape moves in a serpentine manner, the index is essentially in the middle of the tape, and the tape speed varies with the rate at which data is arriving. The index in the middle of the tape increases the speed at which the index can be written to and read. The variable tape speed allows the density of data on the tape to be maximized. For example, when the video is essentially static and little data is being generated, the tape slows down so that this little data is not spread over an unnecessarily large length of tape. This tape drive has rapid seek speeds, exceptional transfer rates, data reliability and maximized media life. A single tape can store 60 gigabytes in the preferred mode, and up to 120 gigabytes if necessary. The ADR tape system has a $10^{19}$ bit error rate.

Figure 4:
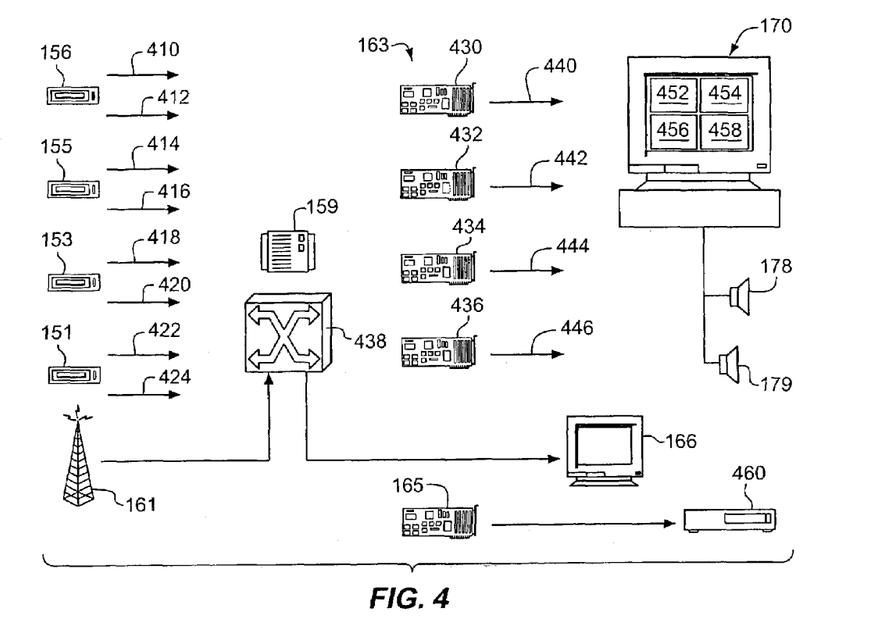
FIG. 4 is a diagram illustrating the synchronization of MPEG audio/video according to the invention.

Turning to FIG. 4, a graphical representation of the synchronization capabilities of the surveillance system 100 according to the invention is shown. In this illustration, four MPEG-2 channels are synchronized and monitored simultaneously on monitor 170. The essential elements illustrated are four digital tape drives 151, 153, 155, and 156, the hard drive buffers 159, MPEG-1 channel selector 538, MPEG-2 decoders 430, 432, 434, and 436, monitor 170, speakers 178 and 179, antenna 161, MPEG-1 monitor 166, MPEG-1 decoder 165, and VHS recorder 460. A digital tape cartridge recorded according to the invention is inserted into each of the four tape drives 151, 153, 155, and 156. In the preferred embodiment discussed above, from these four tapes, eight MPEG-2 channels are available as follows: channel 410 carries the exterior video and the audio from the two officers in a first patrol car; channel 412 carries the interior video, the interior audio, and the dispatch audio from the first patrol car; channel 414 carries the exterior video and the audio from the two officers in a second patrol car; channel 416 carries the interior video, the interior audio, and the dispatch audio from the second patrol car; channel 418 carries the exterior video and the audio from the two officers in a third patrol car; channel 420 carries the interior video, the interior audio, and the dispatch audio from the third patrol car; channel 422 carries the exterior video and the audio from the two officers in a fourth patrol car; and channel 424 carries the interior video, the interior audio, and the dispatch audio from the fourth patrol car. Any four of these eight MPEG-2 channels may be fed to any one of MPEG-2 decoders 430, 432, 434, and 436. The video from the selected channels is synchronized so that frames shot at the same time are simultaneously viewed on monitor 170. Another feature of the software is that the time and location of an event can be entered and the system will search for this time and location and display it. The time and location may be displayed with the event. Further, the video can be advanced and monitored frame-by-frame. Thus, if each of four patrol cars were at an event, synchronized videos 452, 454, 456, and 458 of the event shot from four different perspectives may be viewed simultaneously either in actual motion, slow motion, or frame-by-frame. From such simultaneous monitoring, dynamic analysis of the event, such as echo ranging, audio forensics, and weapon determination, can be quickly and accurately performed. Similarly, selected pairs of the eight audio tracks available may be simultaneously played on speakers 178 and 179. Similarly, if a plurality of cars are at an event, one of the plurality of MPEG-1 videos available may be selected via selector 438 and monitored on MPEG-1 monitor 166. Alternatively, a selected MPEG-1 channel may be decoded and recorded on VHS recorder 460. For example, this MPEG-1 channel could be a real-time video of the same location at which the scenes 452, 454, 456, and 458 were shot. The foregoing is not intended to be exhaustive of the possible uses of the system according to the invention, and, in fact, a myriad of different applications are possible. Rather, the above scenarios have been presented as examples of the use of the system 100 to better illustrate its operation.

Figure 5:
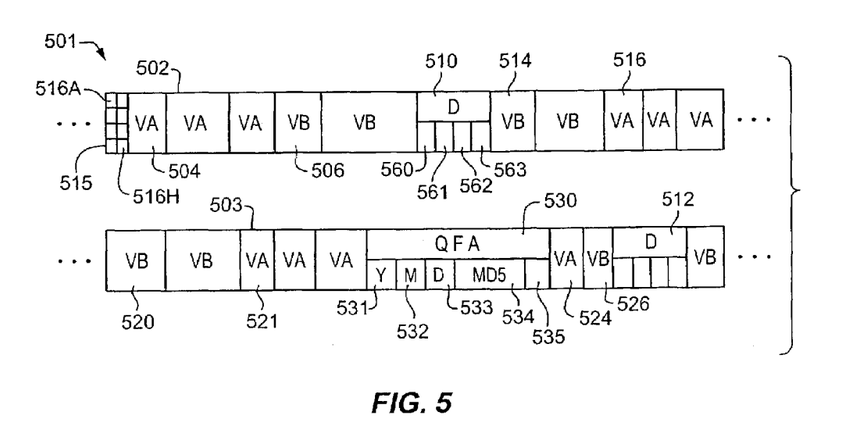
FIG. 5 is a schematic diagram of a data packet according to the invention.

As discussed above, the MPEG encoding and coding used in the invention are standard processes known in the art, and thus they will not be described in detail herein. A detailed description of the MPEG systems and processes is contained in "*An introduction to MPEG video compression*", by John Wiseman; "Coding of Moving Pictures and Associated Audio for Digital Storage Media at up to about 1.5 Mbit/s", *ISO/IEC* 11172-2: Video (November 1991); and "Generic Coding of Moving Pictures and Associated Audio Information: Video", *ISO/IEC* 13818-2 Draft International Standard (November 1994), all of which are hereby incorporated by reference to the same extent as though fully disclosed herein. However, the packetizing of the encoded MPEG-2 data and the arrangement of the packets in the data stream provided by the invention are novel. An illustration of an audio/visual data stream 501 as it can appear on a tape 199 according to the invention is shown in FIG. 5. FIG. 5 shows two portions 502 and 503 of a single data stream 501. Portion 503 is a continuation of portion 502, though there is a substantial portion between the two portions 502 and 503 that is not shown, as indicated by the dots. The two portions are shown on separate lines because of the width limitations of the USPTO drawing page. As discussed above, two MPEG-2 channels are encoded from a single patrol car. The data from the first MPEG-2 channel is carried in packets which in FIG. 5 are designated as VA, while the data from the second MPEG-2 channel is carried in packets designated as VB. Each MPEG-2 channel includes a video channel and two audio channels. In the preferred embodiment, the exterior video photographed through the windshield of the patrol car is combined with the audio from the two officers for one channel, and the video of the interior of the car is combined with the audio from the interior of the car and the dispatcher. This is the preferred arrangement because in many events the police officers are outside the car, and, of course the dispatcher and internal car audio are more likely to correlate with the interior video of the car. However, other combinations are also possible. In addition to the MPEG-2 channels, the data stream 501 also includes data packets which contain digital data that generally is neither audio nor visual, which packets are designated with a "D". The packets D preferably contain specific types of information at specific locations; for example, geographic information may be located at a first location 560, information relating to if and when the officer removes the patrol shotgun from its cradle and when it is returned at a location 561, radar information, such as recorded speeds, at a location 562, and any other information of interest to the user at location 563. More or less data locations may be in the packet D. In the preferred embodiment of the invention, a packet D is generated every five seconds, though other periods may be used, or other criterion for when a data packet D is generated may be used. Finally, the tape includes tracking information that is recorded at a QFA (Quick Find and Access) location 530. Preferably, the QFA location is at or near the center of the tape. This data includes year data 531, month data 532, day data 533, an MD5 hash value 534, as well as other data 535. As will be discussed in more detail below, to enable a quick find function, the tracking information is preferably stored in a buffer and is recorded on the tape just before it is removed. In addition, all the information in the "D" packet and the QFA is recorded in a header associated with each packet. One such header 515 having data locations 516A through 516H is shown for the VA packet 504. Every VA and VB packet has a similar header. Alternatively, this data is stored in a GOP header extension user data field. The fact that the data is also stored in the headers permits the "D" data and the QFA directory data to be reconstructed in case of a sudden power failure or other failure of the system that corrupts the D or QFA information. The system 100 according to the invention provides a utility that performs this reconstruction process.

The audio/visual packets VA and VB preferably are of variable length, depending on the complexity of the information being captured. For example, if the scene being photographed is rapidly changing, the packets will be longer, and if the scene being photographed is static, the packets will be short. In the preferred embodiment of the invention, the longest packets are 32 kb-20 bytes and the shortest packets are 21 bytes. The packets are created and placed in the stream by a protocol that depends on the amount of data in a buffer and other efficiency factors. Those skilled in the art of communication buffers will be able to create appropriate packets; thus, the details of this protocol shall not be discussed herein. Many different such protocols may be used. In the portions of the data stream shown in FIG. 5, the data stream includes three VA packets beginning with packet 504, four VB packets beginning with packet 506, three VA packets beginning with packet 516, two VB packets beginning with packet 520, four VA packets beginning with packet 521, and two VB packets beginning with packet 526. There are also two D packets 510 and 512, one being inserted just before packet 514 and the other after packet 526. Packet 524 was not placed sequentially after the other VB packets in the 521 series because the tape is partitioned to reserve the location 530 for the QFA data.

FIG. 6 is a schematic diagram 600 showing the primary software components of the preferred embodiment of the invention and the relationships between the software and hardware components in the preferred embodiment. In the preferred embodiment, the software of the invention is made to run on a Windows™ operating system. As known in the art, the state-of-the-art Windows™ operating systems include a kernal mode 602 and a user mode 604. Physical devices 606, such as tape drives, are connected into the Windows™ system via a hardware abstraction layer (HAL) 624. In addition to the HAL 624, the kernal mode includes a system services layer 620. Between the system services layer and the HAL layer, a Windows Executive system 602 operates. Windows Executive System 602 includes an object manager 626, a virtual memory manager 628, an I/O manager 630, a cache manager 630, and a process manager 634. The system services layer communicates with the HAL layer via device class drivers 636, which are part of the Windows™ system and specific mini-port drivers 612 provided by the manufacturers of the physical devices, which integrate into the device class drivers as indicated by the notch 637. The system services layer 620 and the user mode applications above it communicate with the device drivers via unique file system software 610 which forms an important part of the invention and will be described below. As known in the art, the user mode 604 includes a Windows™ security system 640, a Win32 subsystem 642, as well as other subsystems 644. Client threads, also know as applications, such as 650, 652, 654, and 656, communicate with the kernal mode through one of the subsystems, depending on the functions they implement. As will be seen below, the encoder and decoder systems are specific client threads.

Figure 7:
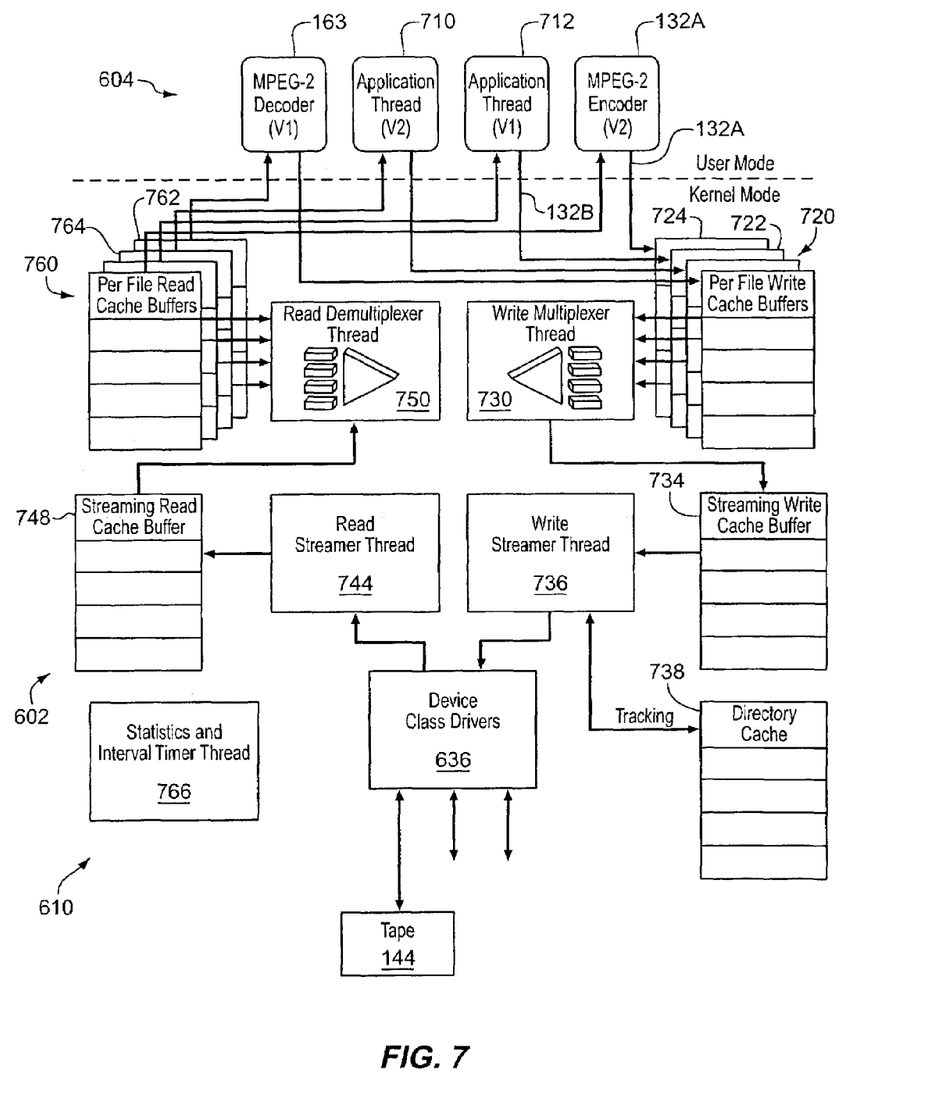
FIG. 7 is a schematic diagram showing the details of the file system and caching scheme of the embodiment of FIG. 1.

The inventive file system 610 and how it operates the hardware described above is illustrated in FIG. 7. The right side of FIG. 7 describes the file system as it operates in the electronics box 130 of the patrol car, while the left side describes the file system as it operates in the command center 104. As suggested above, the file system 610 accepts data from the application threads 159, 710, 712, and 132, which are specific instances of the client threads of FIG. 6, processes the data, and delivers it to the device class drivers 636, which deliver it to the physical devices. The physical device of most interest herein is the tape drive 144 within the patrol car 202. The specific application threads of interest are the MPEG-2 encoder 132 channels 132A and 132B and the MPEG-2 decoder channels such as 410 and 412 (FIG. 4). As discussed above, in the preferred embodiment of the invention, there are two MPEG-2 channels 132A and 132B from encoder card 132. In FIG. 7, one of the threads is labeled 132. However, the other thread is labeled generally as an application thread 712. The threads are also labeled V1 and V2 to indicate which video source is involved, though it should be understood that audio sources are also included. Likewise, there are two MPEG-2 decoder channels in the preferred embodiment of the invention, but one is labeled generally as an application thread. This has been done to emphasize the fact that the file system 610 according to the invention has many applications other than serving to organize and direct MPEG-2 data. That is, the patrol car application discussed herein is only one example of the use of the file system 610. In the discussion of the operation of the file system 610 to follow, the functions of the various software elements of FIG. 6 will not be discussed in detail since these are well known in the art. However, it will be understood by those knowledgeable about the Windows™ operating system that many of these elements assist in the operations described.

In the file system 610 according to the invention, the data generated by application threads 712 and 132, which in the application herein are encoded MPEG-2 audio/video channels, is directed to per file write cache buffers 720. Each application thread, that is, each MPEG-2 channel, is directed to a different buffer. The V1 channel is directed to buffer 724 and the V2 channel is directed to buffer 726. In the embodiment shown, there can be up to four application threads, as four buffers are shown; however, more than four application threads and more than four per file write cache buffers may be used. The data in the buffers 720 is organized into VA, VB, and D packets and interleaved into a data stream 501 by write multiplexer thread 730. The data stream is directed to streaming write cache buffer 734. The purpose of streaming write cache buffer 734 is to eliminate any differences between the flow of the data stream and the operation of tape 144, which differences originate can arise in the mechanical operations of the tape drive. For example, the tape must pause in accepting data when it reaches the end of the tape and reverses. During this time, the streaming write cache buffer will collect and hold the streaming data. The write streamer thread 736 forms the final streamer thread and directs it to driver 636 which delivers it to tape 144. The data stream is parsed continually in write streamer thread and tracking data, such as the location of GOP headers, and year/month/day information is stored in directory cache 738.

In another embodiment of the invention, the MPEG GOP headers are modified to add the geographic and year/month/day information. Other digital information may also be added to the GOP headers. In this embodiment, the decode system software is modified to read this information. In another embodiment, this data is periodically added to the MPEG-1 stream with a marker to permit it to be easily found. This information is preferably displayed directly on the screen on the monitor with the video, although this feature can be turned off.

Content verification of the video, audio, and GPS data is done via computation of an MD5 (Message Digits 5) hash on the data streams as they are output from the hardware encoding devices. To insure that encoded data is not modified and re-hashed, an administratively designated non-retrievable pass-code is assigned to each Mobile Unit before it enters the field. The resultant hash codes, a combination of data and pass-code, is stored with the directory data and can be used to tell if any of the data streams have been modified. MD5 hash codes (128 bits) are computed over video GOP intervals; i.e., they are constructed from all video, audio, and PS encapsulation data between GOP headers. This process is not an encryption or watermarking scheme. The message digest function is also sometimes referred to as a one-way hash function.

The MD5 hash function is a one-way algorithmic operation that transforms a string of data of any length into a shorter fixed-length value, usually 128 bits or 16 bytes long. The algorithm is coded in such a way that there is a negligible probability that any two strings of data will produce the same hash value. If just a single piece of data is changed, a different hash value results. At any time, data integrity can be checked by running a utility verification program supplying the original pass-code, which program is generally referred to as a checksum procedure. That is, the data integrity can be verified by running a hash operation on the data and the private pass-code, i.e., the one assigned to the patrol car when it enters the field. The resultant hash value is compared to the hash value stored in the data. If the two values match, that data has not been altered, tampered with, or modified in any way, and the data's integrity can be trusted. This comports with the "best evidence rule" and authentication requirements used by courts. The MD5 algorithm is a well-known standardized algorithm. Thus, it will not be further discussed herein. It is generally believed that it is computationally infeasible to duplicate an MD5 message, or to produce any pre-specified MD5 message.

Just before the tape is removed, the information from directory cache 738 is written to the QFA portion of tape 199.

The operation of file system 610 in command center unit 104 is the reverse of its operation in the patrol car. The data stream is read out of the tape drive via the device class drivers 636 and delivered to the read streamer thread 744. The read streamer thread 744 directs it to streaming read cache buffer 748, which smooths out any discrepancies between the flow of data and the mechanical operation of the tape drive 144. The data stream is demultiplexed by read demultiplexer thread 750, and the data associated with each application thread is cached in the appropriate one of per file read cache buffers 760. Namely, the data from the V1 MPEG-2 channel is cached in buffer 762 and the data from the V2 channel is cached in buffer 764. The buffers then stream the data to the corresponding application thread, which in the exemplary embodiment is the corresponding decoder 163 or 710. Those skilled in the art will recognize that the hard disks 146 together with the microprocessors 142, under software control, act as the buffers and multiplexers of the patrol unit side while the hard disks 159 and microprocessor 158, under software control, serve as the buffers and demultiplexer of the command side. These buffering and multiplexing functions are well-understood in the computer art and therefore will not be described in detail herein. The file system 610 also includes statistics and interval time thread 766. Thread 766 provides a set of private I/O Control (IOCTL) codes that allow an application program to set options and gather statistics on file system performance. The statistics gathered can be used to tune cache buffer sizes and optimize aspects of the read/write streaming algorithms.

The streaming write capabilities of sequential access devices dictate that write operations always be performed at the current End-of-Data location. This knowledge forms the basis of the above-described two-stage write cache architecture. Write caching is done on a per-file basis to decouple slow sequential device access times from the application thread requesting the synchronous write operation. For synchronous writes, the application thread is blocked only until write data has been queued to the write cache buffers. The write queue is serviced by an internal worker thread that is directed by a multiplexing algorithm, which places its results into the device's multiplexed-write queue. The multiplexed-write queue is serviced by an internal worker thread that is directed by a streaming algorithm optimized for device write streaming. To mitigate paging area contention, internal cache areas are backed by temporary files on disk-based file systems, preferably on non-paging NTFS drives. Data from multiple file write sessions is multiplexed at the media block level such that the average data rate for a given file is maintained over time.

The streaming read capabilities of sequential access devices permit random read access. Because of this capability, and the need to permit multiple simultaneous reads, the read cache process is not an exact mirror of the write cache process. Read data is read-ahead streamed off the device and placed into the multiplexed-read queue. When a specific file is opened, its data is broken out from the multiplexed-read queue into its own read cache buffers. The read cache buffers and the multiplexed-read queue are filled by a special algorithm optimized to give increased read performance priority to files that were opened first.

The system 100 uses a TCP mediated distributed architecture providing flexible scalability through the addition of modular components. This network-based approach uses TCP/IP point-to-point connections for commands that don't require synchronization (i.e., configuration and monitoring). For synchronized activities, a UDP connectionless protocol is used to broadcast commands providing more accurately synchronized record/play/stop/pause functionality across the distributed architecture.

A feature of the invention is that sequential write performance is equivalent to that of writing to a physical disk drive. Read performance is based on a number of factors. If the files being read were written at the same time, i.e., their blocks were multiplexed close together, then read performance is equivalent to that of reading from a physical disk drive if the average aggregate read data rate is not greater that that of the underlying sequential access device. If aggressive head movement or volume exchange is required to obtain their data blocks, then read threads are delayed until such data can be located.

Other details of the system 100 are as follows. Since the geographic information is available via the MPEG-1 stream as discussed above, this information can be used to locate the patrol car in an emergency. It is also evident that the invention can be used to construct all-points news bulletins, notification to other departments, and has many applications for training purposes. The system 100 includes electronic circuitry, software, and processes to provide remote power-on/boot and power-off from the patrol car dashboard, full cycle boot at power up without user intervention, vehicle ignition-controlled start and shutdown, programmable shutdown, battery-fed continuous operation after ignition shut down, vehicle speed, direction, and location integration via the GPS information, out-of area and failure notification, and status of storage available indication. System status lights and failure lights are dashboard mounted. The central command center features include: on-demand wireless communications with mobile units for audio and video "real-time" viewing, post-event playback and review capabilities, multiple unit synchronization, full VTR controls with added search capabilities, and post-production capabilities. Existing MDT, CDMA, or cellular technologies can be incorporated for the wireless transport of the MPEG-1 signal, geographic and time data, patrol unit and shift, and other significant information. Built-in diagnostics monitor video encoder status, battery condition, power supply output, system operating temperature, and many more system conditions. The command server 157 has been designed using a single board computer (SBC) with the Coppermine™ 700 MHz Pentium III Processor, and up to 512 MB of Random Access Memory (RAM). The SBC is designed to be a functioning "mini" computer built onto a PCI card. In the event of a failure of the board, CPU, or RAM, the card is simply replaced without dismantling the entire system. As indicated above, the command server can be equipped with CD-ROM recorders, DVD recorders, or digital tape recorders for long-term archival depending on client needs. The Raid system 159 is preferably a RAID 01 system with mirrored hard drives. The cameras are high-resolution color for normal light IR with monochrome imaging for low or no light situations. They both have wide angle camera lenses and include a composite video splitter, i.e., two inputs to one composite output. The front facing color camera 118 features a ⅓-inch CCD capable of capturing an NTSC image with 480 lines of horizontal resolution. The minimum illumination is 1.0 Lux through an auto iris F/1.2 lens. The rear facing wide-angle color camera 120 features a ¼-inch CCD capable of capturing an NTSC image with 350 lines of horizontal resolution. The minimum illumination is 2.0 Lux through an F/2.0 lens. The interior microphone 114 is sensitive to 1V/Pa@1 kHz (−2.5 dBV+/−4 dBV) and has an output impedance of less than 150 Ohms. The voice input distance ranges from 7 cm to 1.5 m to accurately capture all audio within the seating area of the patrol car.

The system includes automatic file naming with unit number, date, time, and shift, which is included in the QFA section.

A feature of the invention is that the streaming tape recorder capable of a data rate equal to or greater than the aggregate recording rate permits VCR-like functionality in a digital tape recorder of much higher resolution.

Current mobile surveillance systems record to analog VHS tapes or camcorders. The problem with analog VHS tapes is that the video quality is poor and most tapes record for only a couple of hours. Some manufacturers claim much longer recording times of up to eight hours, but those are typically at very slow frame rates of recording, making for jerky movements and poor image quality. A feature of the invention is that DVD quality video results. Additionally, digital tapes can be reused for 30,000 cycles and the shelf life for digital tapes with no degradation in quality approaches thirty years as compared to 30 cycles and one to five years for analog tapes.

It is a feature of the invention that the data is streamed to digital tape in real time. Except in cases where the tape is changing direction or some similar event, the data is processed immediately and passed to the tape, rather than being stored for a significant time, for example, for a time greater than normal computer processing time, and then processed later. Real time also means that, from the perspective of a human being, the transfer to tape usually would appear to be instantaneous. A related feature is that, in the system of the invention, the digital recorder and digital tape comprise the primary storage system rather than a backup storage system.

It is another feature of the invention that the system 100 captures full-motion video. Full-motion video is any video that captures at least 24 frames per second and more preferably at least 29 frames per second. As known in the art, the full-motion video NTSC standard is 29.97 frames per second. A related feature of the invention is that the system 100 at the same time captures full-frame video, which means any resolution of at least 720×480 pixels. A further related feature of the invention is that the system 100 can capture at least eight hours of full-motion, full-frame video on a single digital tape. A further related feature of the invention is that the system 100 can capture at least eight hours of two full-motion, full-frame videos on a single digital tape.

A further feature of the invention is that each data packet, such as 504, is independent. By "independent", it is meant that at least a portion of the audio and a at least a portion a video frame can be reconstructed from a single packet. In the prior art, if a system were downloading a video file and the process was interrupted before it was completed, the result would be unintelligible. However, in the system 100 according to the invention, the packetization system and process results in a single packet being intelligible. Of course, the more packets that are received, the more of the sound and video can be constructed. Thus, if only a portion of a tape is available, say due to a fire or other catastrophe, useful information can still be obtained from the tape.

Another feature of the invention is that the mobile system 102 is designed for use in a dynamically changing environment. The basic unit operates in temperatures in excess of −25° C. to 81.1° C. with an optional electric temperature controlled environment. Depending on configuration, operating temperatures required for the power supply are −25° C. to 81.1° C. or −40° C. to 80° C.

There has been described a novel vehicular surveillance system that permits a full shift of two MPEG-2 channels of full-frame, full-motion audio/video to be captured on a single cartridge tape. The system for the first time permits 24/7 patrol car surveillance at high resolution. Now that the system has been created and disclosed for use in patrol cars, it is evident it will have applications in many situations in which a compact, high-resolution surveillance system is desirable. For example, it will have applications in airplanes, trains, ships, and other vehicles. Thus, wherever the terms "patrol car" or "police car" have been used above, any other vehicle may be substituted. It also will find use in many security applications. It is believed that the invention will make digital tape cartridges a preferred primary storage device. Examples of such applications are as follows. The system of the invention could be used in a manufacturing facility, such as an automotive assembly line or an integrated circuit manufacturing facility for quality control purposes. In such manufacturing processes, defects often occur that are difficult to find the reason for. Since it usually is known when the particular vehicle or part was manufactured, a library of 24/7/365 tapes would be useful in tracing and correcting defective processes or systems. Another example is any test operation, such as the test of a jet fighter or the destructive test of system. Since it is often not known when the object being tested will deviate from specification, a 24/7/365 surveillance system would be useful.

The surveillance system 100 according to the invention was developed to provide an improved patrol car surveillance system. To achieve this goal, many novel components had to be developed. Now that the system has been built, it is evident that many of these elements will have important uses in other applications. For example, the file system 610 according to the invention that streams data to digital tape will be useful in many instances in which rapid streaming of sequential time and/or geographic synchronized data is desired. For example, it is useful in database logging, ISP logging, transaction logging, firewall logging, backups, general audio/video encoding, and data acquisition.

A feature of the file system 610 is its ability to multiplex data from several streams into one bundled stream that is then stored on and retrievable from the tape drive. The second feature is the ability to access the tape drive from a PC as a local drive letter or as a Universal Naming Convention (UNC) mapping across a network. In addition, the relative cost of tape drives and their media is less, on a per gigabyte basis, than the cost of hard drives. These features move the tape drive from its traditional position as a data backup product to that of a primary storage medium for many applications. The types of applications that are particularly targeted are: (i) those in which the data does not need to be accessed often; (ii) those in which data does not need to be written onto the tape and accessed at the same time; and (iii) any of the foregoing applications that would benefit from a removable medium.

It should be understood that the particular embodiments shown in the drawings and described within this specification are for purposes of example and should not be construed to limit the invention, which will be described in the claims below. For example, although the system is particularly useful if MPEG-2 compression is used, any MPEG compression scheme, known now or in the future, may be substituted. In fact, since this is the first disclosure of any direct streaming of compressed audio/visual signal to digital tape, it is inventive to use any present or future digital compression scheme, for example, MJPEG sometimes referred to as motion JPEG (Joint Photographic Experts Group), and it is contemplated that the future versions of the invention will include hardware and software to utilize many other digital compression apparatuses and processes. Further, it is evident that those skilled in the art may now make numerous uses and modifications of the specific embodiments described without departing from the inventive concepts. It is also evident that the methods recited may in many instances be performed in a different order; or equivalent structures and processes may be substituted for the various structures and processes described. Consequently, the invention is to be construed as embracing each and every novel feature and novel combination of features present in and/or possessed by the invention herein described.

We claim:

1. A digital video surveillance system comprising:

a source of a video signal;

a mobile video digital recorder including:

an MPEG encoder for compressing said video signal to produce an MPEG encoded video data signal;

a storage device for storing said MPEG encoded video data signal, said storage device capable of recording eight continuous hours of said video signal at an equivalent resolution of 720×480 lines of resolution at 24 frames per second or more;

a digital command center system including:

a storage system for digitally storing a plurality of said recorded video signals from a plurality of said mobile video digital recorders along with non-audio/non-video tracking information associated with each of said plurality of recorded videos;

a video retrieval system for retrieving one or more of said recorded video signals based on said non-audio/non-video tracking information; and a display for displaying said retrieved video signal;

said digital video surveillance system further including an electronic authentication system to insure that said encoded video data signal is not modified, thereby preserving the evidentiary quality of said recorded video signal.

2. A digital video surveillance system as in claim 1 wherein said non-audio/non-video tracking information comprises time information.

3. A video surveillance system as in claim 1 wherein said non-audio/non-video tracking information comprises geographic location information.

4. A digital video surveillance system as in claim 1 wherein said non-audio/non-video tracking information comprises patrol unit information.

5. A digital video surveillance system as in claim 1 wherein said resolution is at 30 frames per second.

6. A digital video surveillance system as in claim 1 wherein said authentication system comprises a private code stored in said encoded data.

7. A digital video surveillance system as in claim 1 wherein said authentication system comprises a hash function.

8. A digital video surveillance system as in claim 1 wherein said digital command center further includes a video recorder for recording said retrieved video signal.

9. A digital video surveillance system as in claim 8 wherein said video recorder comprises a DVD recorder.

10. A digital video surveillance system as in claim 1 wherein said MPEG encoder is an MPEG-2 encoder.

* * * * *